United States Patent
Marsala et al.

(10) Patent No.: US 11,248,455 B2
(45) Date of Patent: Feb. 15, 2022

(54) ACOUSTIC GEOSTEERING IN DIRECTIONAL DRILLING

(71) Applicant: Saudi Arabian Oil Company, Dhahran (SA)

(72) Inventors: Alberto F. Marsala, Dhahran (SA); Michael Jervis, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/838,479

(22) Filed: Apr. 2, 2020

(65) Prior Publication Data
US 2021/0310342 A1 Oct. 7, 2021

(51) Int. Cl.
*E21B 43/16* (2006.01)
*E21B 47/024* (2006.01)

(52) U.S. Cl.
CPC .......... *E21B 43/16* (2013.01); *E21B 47/024* (2013.01)

(58) Field of Classification Search
CPC ..... E21B 43/16; E21B 47/024; E21B 41/0092
See application file for complete search history.

(56) References Cited

U.S. PATENT DOCUMENTS

| 3,292,143 A | 12/1966 | Russell |
| 4,676,313 A | 6/1987 | Rinaldi |
| 5,128,901 A | 7/1992 | Drumheller |
| 5,151,658 A | 9/1992 | Muramatsu et al. |
| 5,176,207 A | 1/1993 | Keller |
| 5,753,812 A | 5/1998 | Aron |
| 5,854,991 A | 12/1998 | Gupta et al. |
| 5,876,645 A | 3/1999 | Johnson |
| 5,877,995 A | 3/1999 | Thompson |
| 5,886,303 A | 3/1999 | Rodney |
| 6,026,900 A | 2/2000 | Keller |
| 6,283,209 B1 | 9/2001 | Keller |

(Continued)

FOREIGN PATENT DOCUMENTS

| CA | 2856274 | 3/2016 |
| EP | 1803001 | 2/2012 |

(Continued)

OTHER PUBLICATIONS aflglobal.com' [online], "MiniBend Fiber Optic Component for Downhole Double-Ended Systems and Optical Connectivity," available on or before Jun. 8, 2012, retrieved on Jun. 12, 2018, retrieved from URL: <https://www.aflglobal.com/productlist/Product-Lines/Fiber-Optic-Cable/MiniBend_for_Downhole_Double-Ended_Systems_Optic/doc/MiniBend.aspx>, 1 page.

(Continued)

*Primary Examiner* — James G Sayre
(74) *Attorney, Agent, or Firm* — Fish & Richardson P.C.

(57) ABSTRACT

A method for acoustic geosteering in directional drilling is provided. The method includes measuring a response from a fiber-optic distributed acoustic sensor disposed on a bottom hole assembly and determining a location of the bottom hole assembly from seismic waves received from surface sources. A subterranean layer structure proximate to the bottom hole assembly is determined from reflections of a locally generated soundwave. Adjustments to geosteering vectors for the bottom hole assembly are determined based, at least in part, on the location and the subterranean layer structure.

24 Claims, 5 Drawing Sheets

(56) References Cited

U.S. PATENT DOCUMENTS

| | | | |
|---|---|---|---|
| 6,739,165 B1 | 5/2004 | Strack | |
| 6,740,141 B2 | 5/2004 | Espin et al. | |
| 7,093,672 B2 | 8/2006 | Seydoux et al. | |
| 7,376,517 B2 | 5/2008 | Rickett | |
| 7,595,737 B2 | 9/2009 | Fink et al. | |
| 7,721,803 B2 | 5/2010 | Huang et al. | |
| 7,913,806 B2 | 3/2011 | Pabon | |
| 7,937,222 B2 | 5/2011 | Donadille et al. | |
| 7,991,555 B2 | 8/2011 | Yang et al. | |
| 8,069,913 B2 | 12/2011 | Coste | |
| 8,090,538 B2 | 1/2012 | Wilkinson et al. | |
| 8,101,907 B2 | 1/2012 | Jacobi et al. | |
| 8,168,570 B2 | 5/2012 | Barron et al. | |
| 8,215,384 B2 * | 7/2012 | Trinh | E21B 47/017 166/177.1 |
| 8,230,918 B2 | 7/2012 | Ameen | |
| 8,253,417 B2 | 8/2012 | Pislak et al. | |
| 8,269,501 B2 | 9/2012 | Schmidt et al. | |
| 8,347,985 B2 | 1/2013 | Bittar | |
| 8,424,377 B2 | 4/2013 | Keller | |
| 8,627,902 B2 | 1/2014 | Hammer et al. | |
| 8,664,586 B2 | 3/2014 | Schmidt | |
| 8,714,246 B2 | 5/2014 | Pop et al. | |
| 8,803,077 B2 | 8/2014 | Schmidt | |
| 8,976,625 B2 | 3/2015 | Bilas | |
| 8,997,868 B2 | 4/2015 | Nguyen et al. | |
| 9,002,649 B2 | 4/2015 | Bittar | |
| 9,080,097 B2 | 7/2015 | Gupta et al. | |
| 9,128,203 B2 | 9/2015 | Al-Dossary et al. | |
| 9,274,249 B2 | 3/2016 | Thorne | |
| 9,366,099 B2 | 6/2016 | Ly | |
| 9,494,033 B2 | 11/2016 | Taherian et al. | |
| 9,557,434 B2 | 1/2017 | Keller et al. | |
| 9,644,472 B2 | 5/2017 | Fuhst et al. | |
| 9,689,253 B2 | 6/2017 | Rivero | |
| 9,733,191 B2 | 8/2017 | Bittar et al. | |
| 9,952,192 B2 | 4/2018 | Donzier et al. | |
| 9,983,328 B2 | 5/2018 | Marsala | |
| 10,030,486 B1 | 7/2018 | Keller | |
| 10,095,983 B1 | 10/2018 | Venter et al. | |
| 10,125,546 B2 | 11/2018 | Wu et al. | |
| 10,125,586 B2 | 11/2018 | Balan et al. | |
| 10,254,430 B2 | 4/2019 | Fang et al. | |
| 10,288,755 B2 | 5/2019 | Cordery | |
| 10,294,771 B2 | 5/2019 | Donzier et al. | |
| 2001/0017163 A1 | 8/2001 | Penza | |
| 2004/0108110 A1 | 6/2004 | Zupanick et al. | |
| 2004/0246141 A1 | 12/2004 | Tubel et al. | |
| 2005/0034917 A1 | 2/2005 | Mathiszik et al. | |
| 2005/0078555 A1 | 4/2005 | Tang et al. | |
| 2005/0252286 A1 | 11/2005 | Ibrahim et al. | |
| 2006/0104578 A1 | 5/2006 | Herbst | |
| 2008/0066960 A1 * | 3/2008 | Mathiszik | E21B 47/06 175/41 |
| 2008/0257546 A1 | 10/2008 | Cresswell et al. | |
| 2008/0290874 A1 | 11/2008 | Seleznev et al. | |
| 2009/0087911 A1 | 4/2009 | Rogerio | |
| 2009/0164188 A1 | 6/2009 | Habashy | |
| 2009/0288820 A1 | 11/2009 | Barron et al. | |
| 2010/0078164 A1 | 4/2010 | Bostick et al. | |
| 2010/0109672 A1 | 5/2010 | Rabinovich et al. | |
| 2010/0200248 A1 | 8/2010 | Kriesels et al. | |
| 2010/0296100 A1 * | 11/2010 | Blacklaw | G01C 19/728 356/460 |
| 2011/0042083 A1 | 2/2011 | Sierra et al. | |
| 2011/0309835 A1 | 12/2011 | Barber et al. | |
| 2012/0016649 A1 | 1/2012 | Thambynayagam et al. | |
| 2012/0062886 A1 | 3/2012 | Piotti et al. | |
| 2012/0253680 A1 | 10/2012 | Thompson | |
| 2012/0325465 A1 | 12/2012 | Hammer et al. | |
| 2013/0091941 A1 | 4/2013 | Huh | |
| 2014/0041862 A1 | 2/2014 | Ersoz | |
| 2014/0180592 A1 | 6/2014 | Ravi | |
| 2014/0180658 A1 | 6/2014 | Rossi | |
| 2014/0208843 A1 * | 7/2014 | Godfrey | E21B 43/119 73/152.58 |
| 2014/0238670 A1 | 8/2014 | Pop et al. | |
| 2014/0239957 A1 | 8/2014 | Zhang et al. | |
| 2015/0132543 A1 | 5/2015 | Nouzille et al. | |
| 2015/0370934 A1 | 12/2015 | Pride et al. | |
| 2016/0138390 A1 * | 5/2016 | Arntsen | E21B 7/06 175/45 |
| 2016/0259079 A1 * | 9/2016 | Wilson | E21B 7/06 |
| 2016/0282881 A1 | 9/2016 | Filippov | |
| 2017/0260848 A1 | 9/2017 | Xia et al. | |
| 2018/0320514 A1 | 11/2018 | Felkl et al. | |
| 2019/0107643 A1 | 4/2019 | Golmohammadizangabad et al. | |
| 2019/0266501 A1 | 8/2019 | Tavares | |
| 2019/0293814 A1 | 9/2019 | Horne | |
| 2019/0339408 A1 | 11/2019 | Davies | |
| 2019/0368336 A1 | 12/2019 | Hammond et al. | |
| 2020/0034711 A1 | 1/2020 | Misra et al. | |

FOREIGN PATENT DOCUMENTS

| | | |
|---|---|---|
| EP | 2966257 | 1/2016 |
| GB | 2489714 | 10/2012 |
| WO | WO 2011129828 | 10/2011 |
| WO | WO 2014058425 | 4/2014 |
| WO | WO 2014144917 | 9/2014 |
| WO | WO 2014207075 | 12/2014 |
| WO | WO 2015016932 | 2/2015 |
| WO | WO 2015027084 | 2/2015 |
| WO | WO 2015167935 | 11/2015 |
| WO | WO 2015187142 | 12/2015 |
| WO | WO 2016200374 | 12/2016 |
| WO | WO 2018085504 | 5/2018 |

OTHER PUBLICATIONS

Ali et al., "Constraining Interwell Water Flood Imaging with Geology and Petrophysics: An Example from the Middle East," Paper presented at the 2009 SPE Middle East Oil & Gas Show and Conference, Bahrain, Mar. 15-18, 2009, SPE 120558; 11 pages.

Alkhatib et al., "Robust Quantification of Uncertainty in Heterogeneity for Chemical EOR Processes: Applying the Multi-Level Monte Carlo Method," Paper presented at the SPE Middle East Oil & Gas Show and Conference, Bahrain, Mar. 8-11, 2015; 13 pages.

Alsaif et al., "Petrophysical Joint Inversion for Reservoir Saturation Mapping: A Case Study," SPE, Society of Petroleum Engineers, SPE Kingdom of Saudi Arabia Annual Technical Symposium and Exhibition helpd in Dammam, Saudi Arabia, Apr. 24-27, 2017, 7 pages.

Al-Shehri et al., "Illuminating the Reservoir: Magnetic NanoMappers", SPE 164461, Society of Petroleum Engineers, presented at the SPE Middle East Oil and Gas Show and Exhibition on Mar. 10-13, 2013, 10 pages.

Bakulin et al., "Smart DAS upholes for near surface model building and deep imaging with vertical arrays," International Conference on Engineering Geophysics, Oct. 2017, 5 pages.

Bennetzen et al., "Novel Applications of Nanoparticles for Future Enhanced Oil Recovery", IPTC-17857-MS, International Petroleum Technology Conference on Dec. 10-12, 2014, 14 pages.

Brie et al., "SPE 30595: Shear Sonic Interpretation in Gas-Bearing Sands," SPE, SPE Annual Technical Conference and Exhibition, Oct. 22-25, 1995, 10 pages.

Burtman et al., "Experimental Study of Induced Polarization Effect in Unconventional Reservoir Rocks," Geomaterials vol. 04, No. 04, Jan. 1, 2014, 13 pages.

Carey et al., "Analysis of water hammer signatures for fracture diagnostics," Presented at the SPE Annual Technical Conference and Exhibition, Society of Petroleum Engineers, Jan. 2015, 26 pages.

Cheng et al., "Comparison of Q-estimation methods: an update," Q-estimation, CREWES Research Report, vol. 25, 2013, 38 pages.

Cheng et al., "Estimation of Q: a comparison of different computational methods," Integration geoConvention 2013, Geoscience Engineering Partnership, 4 pages.

(56) References Cited

OTHER PUBLICATIONS

Davydycheva et al, "Electrical-Prospecting Method for Hydrocarbon Search Using the Induced-Polarization Effect," Geophysics, Society of Exploration Geophysicists, vol. 71, No. 4, Jul. 1, 2006, 11 pages.
Deschamps et al., "Drilling to the Extreme: the Micro-Coring Bit Concept," IADC/SPE 115187, presented at the IADC/SPE Asai Pacific Drilling Technology Conference and Exhibition, Aug. 25-27, 2008, 12 pages.
Desmette et al., "Drilling Hard and Abrasive Rock Efficiently, or Generating Quality Cuttings? You No Longer Have to Choose . . . ," SPE 116554, Society of Petroleum Engineers, 2008 SPE Annual Technical Conference and Exhibition, Sep. 21-24, 2008, 19 pages.
Dunham et al., "Hydraulic fracture conductivity inferred from tube wave reflections," In SEG Technical Program Expanded Abstracts 2017 (pp. 947-952). Society of Exploration Geophysicists, 6 pages.
Georgi, et al., "Advances in Cuttings Collection and Analysis," SPWLA 34th Annual Logging Symposium, Jun. 13-16, 1993, 20 pages.
Giles, "Multilevel Monte Carlo path simulation," Operations Research, vol. 56, No. 3, May-Jun. 2008; pp. 607-617.
gpxsurveys.com.au' [online], "Ground Geophysics Induced Polarisation", available on or before Mar. 10, 2015, [retrieved Mar. 10, 2015], retrieved from URL: <http://www.gpxsurveys.com.au/Ground-Geophysics/Induced-Polarisation>, 2 pages.
Li et al., "A Comparative Study of the Probabilistic-Collocation and Experimental-Design Methods for Petroleum-Reservoir Uncertainty Quantification," SPE Journal, vol. 16, No. 2, Jun. 2011; pp. 429-439.
Liang et al., "Crosswell Electromagnetic Inversion Constrained by the Fluid-Flow Simulator," Paper presented at the SPE Annual Technical Conference and Exhibition, Florence, Italy, Sep. 19-22, 2010; 11 pages.
Liang et al., "Hydraulic fracture diagnostics from Krauklis-wave resonance and tube-wave reflections," Geophysics, 82(3): D171-D186, May-Jun. 2017, 16 pages.
Marsala et al., "3D inversion practice for crosswell electromagnetic surveys in horizontal wells in Saudi Arabia," 85th Annual International Meeting, SEG, 2015; 4 pages.
Marsala et al., "Crosswell electromagnetic induction between two widely spaced horizontal wells: Coiled-tubing conveyed data collection and 3D inversion from a carbonate reservoir in Saudi Arabia," 85th Annual International Meeting, SEG, 2015; 4 pages.
Marsala et al., "Crosswell Electromagnetic Tomography: from Resistivity Mapping to Interwall Fluid Distribution", IPTC 12229-PP, presented at the International Petroleum Technology Conference on Dec. 3-5, 2008, 6 pages.
Marsala et al., "First Borehole to Surface Electromagnetic Survey in KSA: reservoir mapping & monitoring at a new scale", Spe 146348-PP, presented at the SPE Annual Technical Conference and Exhibition, Oct. 30-Nov. 2, 2011, 10 pages.
Marsala et al., "Fluid Distribution Inter-Well Mapping in Multiple Reservoirs by Innovative Borehole to Surface Electromagnetic: Survey Design and Field Acquisition," Paper presented at the International Petroleum Technology Conference (IPTC-17045), Beijing, China, Mar. 26-28, 2013; 4 pages.
Munn et al., "Novel cable coupling technique for improved shallow distributed acoustic sensor VSPs," Journal of Applied Geophysics vol. 138, Mar. 2017, 8 pages.
Rahmani et al., "Characterizing Reservoir Hetrogeneities Using Magnetic Nanoparticles", SPE-173195-MS, presented at the SPE Reservoir Simulation Symposium on Feb. 23-26, 2015, 29 pages.
Rovetta et al., "Petrophysical Inversion of Resistivity Logging Data," SPE Middle East Oil and Gas Show and Conference, Manama, Bahrain, SPE-184030-MS, Mar. 6-9, 2017, 13 pages.
Santarelli et al., "Formation Evaluation From Logging on Cuttings," SPE Reservoir Evaluation and Engineering, presented at the 1996 SPE Permian Basin Oil and Gas Recovery Conference, Mar. 27-29, 1996, published Jun. 1998, 7 pages.
Tang and Cheng, "A dynamic model for fluid flow in open borehole fractures," Journal of Geophysical Research: Solid Earth, 94, 7567-7576, Jun. 10, 1989, 10 pages.
Tatang et al., "An efficient method for parametric uncertainty analysis of numerical geophysical models," Journal of Geophysical Research, vol. 102, No. D18, Sep. 27, 1997; 8 pages.
Tonn, "The determination of the seismic quality factor Q from VSP data: a comparison of different computational methods," Geophysical Prospecting, 39, 1991, 27 pages.
U.S. Appl. No. 62/513,822, Bakulin et al., Detecting Sub-Terranean Structures, filed Jun. 1, 2017, 34 pages.
Vandamme et al., "How the Invasion Zone Can Contribute to the Estimation of Petrophsyical Properties from Log Inversion at Well Scale?" SPWLA 58th Annual Logging Symposium, SPWLA-2017-JJJ, Jun. 17-21, 2017, 16 pages.
Wilt et al., "Monitoring a Water Flood of Moderate Saturation Changes with Crosswell Electromagnetics (EM): A Case Study from Dom Joao Brazil," Paper presented at the SEG Las Vegas 2012 Annual Meeting, 2012; 4 pages.
Zhang et al., "Petrophysical Inversion of Resistivity Logging Data," 2000 SPE Annual Technical Conference and Exhibition, Dallas, Texas, SPE-63285-MS, Oct. 1-4, 2000, 8 pages.
Zhdanov et al., "Carbonate Reservoir Rocks Show Induced Polarization Effects, Based on Generalized Effective Medium Theoiy", 75th EAGE Conference & Exhibition, Jun. 2013, 5 pages.
PCT International Search Report and Written Opinion in International Appln. No. PCT/US2021/024859, dated Jul. 5, 2021, 14 pages.

* cited by examiner

ACOUSTIC GEOSTEERING IN DIRECTIONAL DRILLING

BACKGROUND

The production of crude oil and other hydrocarbons starts with the drilling of a wellbore into a hydrocarbon reservoir. In many cases, the hydrocarbon reservoir is a narrow layer of material in the subterranean environment, making efficient targeting of the wellbore important for productivity. Accordingly, directional drilling is often used to direct a drill bit to form a wellbore in the reservoir layer.

Drilling may be performed by a rotating drill string, which uses the rotation of the drill string to power a bit to cut through subterranean layers. Changing the orientation of the bit for directional drilling may be performed using a mud motor, for example, by stopping the rotation of the drill string, and activating the mud motor to power the drill bit while the drill string is slid forward down the well, while a bent section of the bottom hole assembly orients the drill string in a new direction. Any number of other techniques have been developed to perform directional drilling.

More recent developments have been in the use of coiled tubing drilling for directional drilling. Directional drilling using coiled tubing may be performed by a mud motor used with hydraulic actuators to change the direction of the bit.

Controlling the direction of the drill string in directional drilling, termed geosteering herein, may be done using any number of techniques. In early techniques, drilling was halted and downhole instrumentation, coupled to the surface by a wireline, was lowered into the wellbore. The wireline instrumentation was used to collect information on the inclination of the end of the wellbore and a magnetic azimuth of the end of the wellbore. This information was used in concert with the depth of the end of the wellbore, for example, measured by the length of the wireline or drill string, to determine the location of the end of the wellbore at a point in time, termed a survey. Collection of a number of surveys was needed to determine the changes needed in drilling operations for geosteering a wellbore to a reservoir layer.

SUMMARY

An implementation described herein provides a method for acoustic geosteering in directional drilling. The method includes measuring a response from a fiber-optic distributed acoustic sensor disposed on a bottom hole assembly and determining a location of the bottom hole assembly from seismic waves received from surface sources. A subterranean layer structure proximate to the bottom hole assembly is determined from reflections of a locally generated soundwave. Adjustments to geosteering vectors for the bottom hole assembly based, at least in part, on the location and the subterranean layer structure.

Another implementation provides a system for acoustic geosteering in directional drilling. The system includes a bottom hole assembly that includes a fiber-optic distributed acoustic sensor comprising an optical fiber helicoidally wrapped around the bottom hole assembly, a drill bit, and a sound transducer located proximate to the drill bit.

DETAILED DESCRIPTION

Techniques are provided herein for geo-steering a downhole assembly during directional drilling. In the techniques, a bottom hole assembly (BHA) mounted on a coiled tubing for coiled tubing drilling (CTD) has optical fibers mounted along the assembly to sense soundwaves. As the CTD apparatus is not rotated during drilling, the optical fibers may be used to communicate the information to the surface, avoiding the need for downhole electronics. Acoustic sources are placed at the surface and along the BHA near the drill bit. The sound waves from the surface sources are used to update the geological model and structural layering as well as to determine the position of the BHA. The acoustic sources on the BHA near the drill bit are used to determine the structure of the subterranean layer structure proximate to the BHA as a deeper acoustic propagation. The measured data can be used in real time to geosteer the wells, by adjusting the drilling trajectory using the location and layer information to target drilling the well inside the most prolific reservoir layers.

Figure 1:
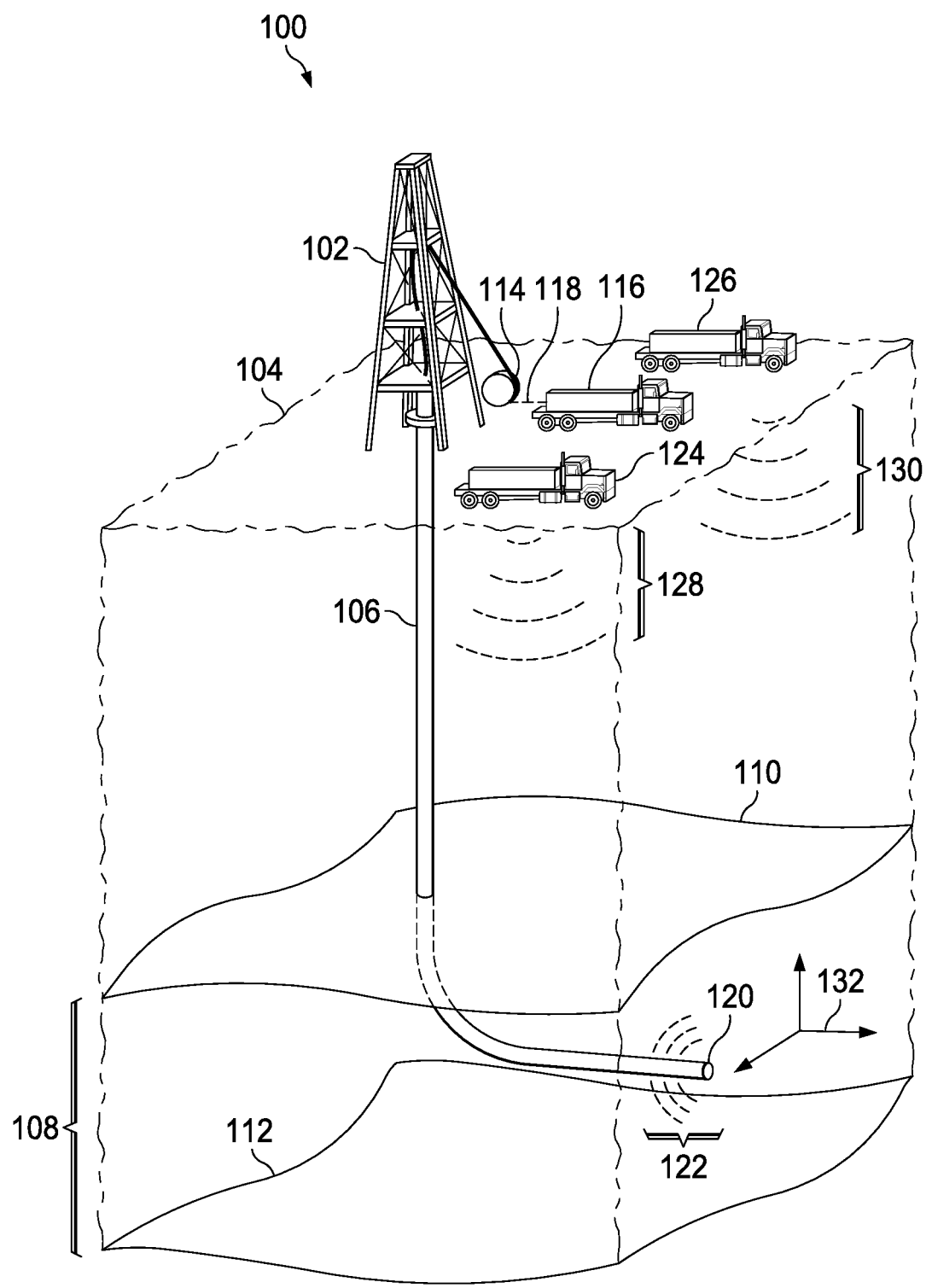
FIG. 1 is a schematic drawing of a method for using soundwaves to geosteer a well during directional drilling.

FIG. 1 is a schematic drawing of a method 100 for using soundwaves to geosteer a well during directional drilling. In the method 100, a drilling rig 102 at the surface 104 is used to drill a wellbore 106 to a reservoir layer 108. In this illustration, the reservoir layer 108 is bounded by an upper layer 110, such as a layer of cap rock, and a lower layer 112, such as a layer containing water.

The drilling rig 102 is coupled to a roll of coiled tubing 114, which is used for the drilling. A control shack 116 may be coupled to the roll of coiled tubing 114 by a cable 118 that includes optical fiber, transducer power lines, and other control lines. The cable 118 may pass through the coiled tubing 114, or alongside the coiled tubing 114, to the end 120 of the wellbore 106, where a couples to the BHA used for drilling the wellbore 106. In embodiments described herein, the BHA emits soundwaves 122 that may be used for layer identification, for example, reflecting off the upper layer 110 and the lower layer 112 to allow a determination of the proximity of the BHA to each of these layers 110 and 112.

Seismic sources 124 and 126, located at the surface 104, are used to emit seismic soundwaves 128 and 130, which are detected by the optical fibers on the BHA located at the end 120 of the wellbore 106. The detection of the seismic soundwaves 128 and 130, received from different surface sources, may allow the triangulation of the location of the BHA. This information, along with the information on the structure of the layers 110 and 112, is used to adjust the vectors 132 to locate the wellbore 106 in the reservoir layer 108.

Figure 2:
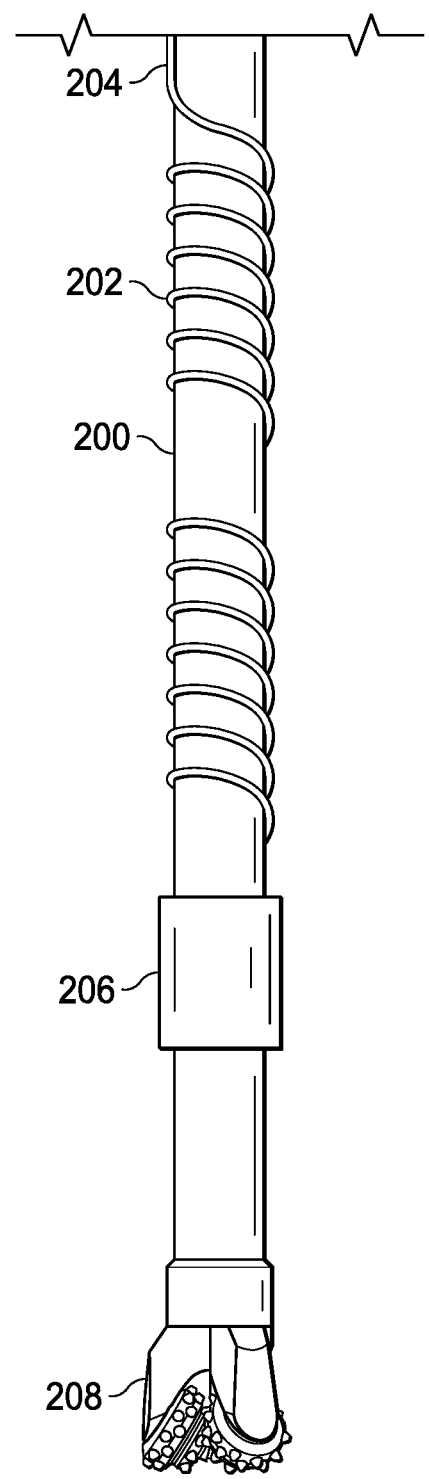
FIG. 2 is a drawing of an instrumented bottom hole assembly (BHA) that may be used for geo-steering in directional drilling in coiled tubing drilling (CTD).

FIG. 2 is a drawing of an instrumented bottom hole assembly (BHA) 200 that may be used for geo-steering in directional drilling in coiled tubing drilling (CTD). The BHA 200 is wrapped in a fiber-optic cable 202, for example, in a helicoidal orientation, which acts as a fiber-optic distributed acoustic sensor (DAS). The helicoidal orientation may reduce directionality of the seismic and soundwave signals. The fiber-optic cable 202 may be wrapped around the coiled tubing to the surface, or may be wrapped around the BHA 200 and coupled to the surface by a straight expense of fiber-optic cable 204 disposed along the coiled tubing. The use of the fiber-optic cable 202 allows many feet of the coiled tubing to be instrumented. The fiber-optic cable 202, or the straight expense of fiber-optic cable 204, is coupled to optical systems at the surface 104 (FIG. 1), such as a laser and a photodetector.

The fiber-optic cable 202 may be a multilayer structure that includes an outer steel mesh over other protective layers surrounding cables that include the optical fibers and any other cables used for communications and power. These may include, for example, a power cable used to power a transducer 206, located proximate to the drill bit 208, to locally generate sounds. In some embodiments, the transducer 206 may be powered by mud flow through the BHA 200. In these cases, the fiber-optic cable 202 may only include the optical fibers in a protective sheath.

Figure 3:
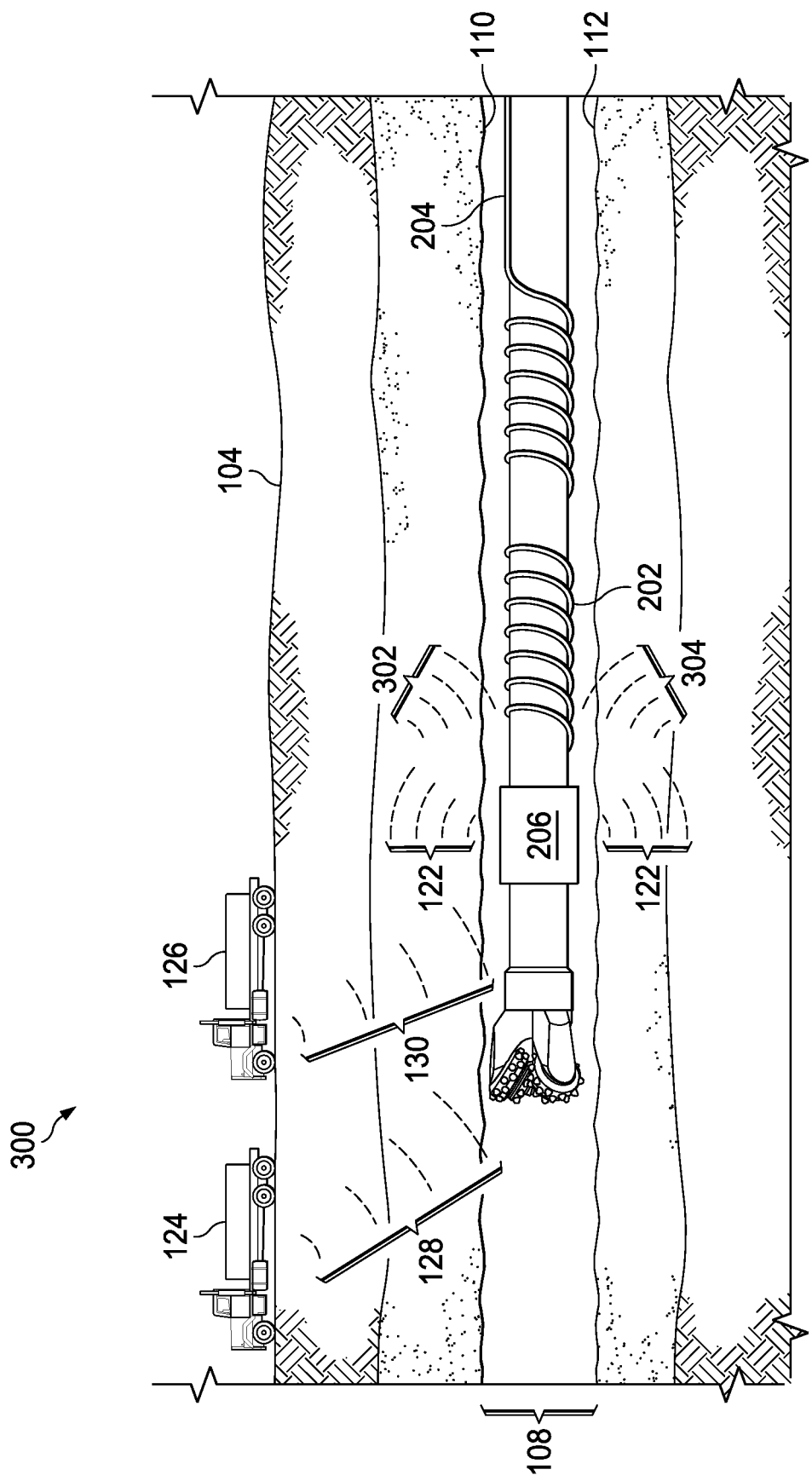
FIG. 3 is a schematic drawing of the BHA showing the use of soundwaves to assist in geosteering.

As discussed further with respect to FIG. 3, the transducer 206 may be used to send soundwaves into areas proximate to the BHA 200, allowing a determination of layer structures from soundwaves reflected back from layers around the BHA 200. The fiber-optic cable 202 will also be used to pick up soundwaves from surface seismic sources.

FIG. 3 is a schematic drawing 300 of the BHA 200 showing the use of soundwaves to assist in geosteering. Like numbered items are as described with respect to FIGS. 1 and 2. As shown in FIG. 3, soundwaves 122 emitted from the transducer 206 are reflected from proximate subterranean layers, such as the upper layer 110 and lower layer 112. The reflected soundwaves 302 and 304 are detected by the optical fibers of the fiber-optic cable 202. The reflected soundwaves 302 and 304 can be used to determine the proximity of the BHA 200 to the layers 110 and 112, allowing the BHA 200 to be steered in the reservoir layer 108 between the layers 110 and 112.

Seismic sources 124 and 126, such as vibroseis, are used to emit seismic soundwaves 128 and 130 at the surface 104. As used herein, a vibroseis is a truck-mounted system that uses a large oscillating mass to generate seismic soundwaves. The vibroseis may be manually controlled, for example, with an operator receiving a communication from the systems described herein to activate the vibroseis. The seismic soundwaves 128 and 130 are detected by the optical fibers of the fiber-optic cable 202. The seismic soundwaves 128 and 130 may be used to triangulate the position of the BHA 200. The combination of the determination of the proximity of the BHA 200 to the layers 110 and 112 with the position of the BHA 200 is used to support geosteering inside the reservoir layer 108.

Figure 4:
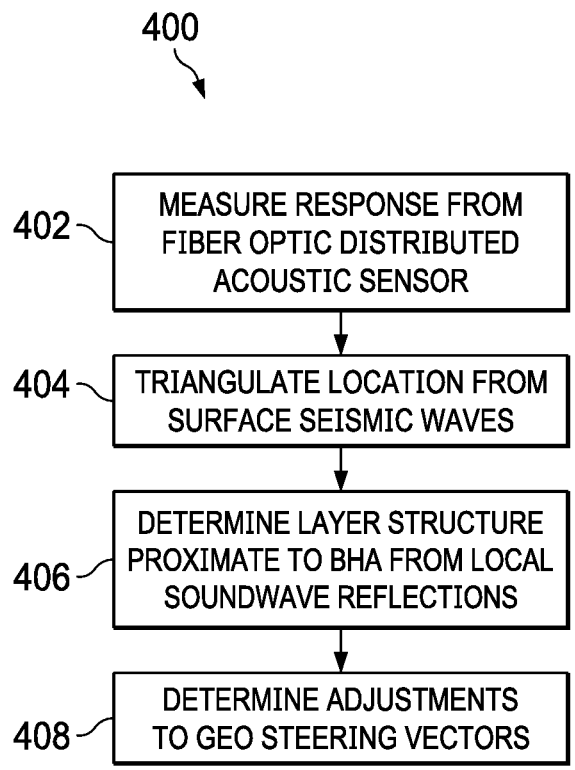
FIG. 4 is a process flow diagram of a method for using soundwaves for geosteering.

FIG. 4 is a process flow diagram of a method 400 for using soundwaves for geosteering. The method 400 begins at block 402, when the response from the fiber-optic distributed acoustic sensor is measured. The measurement will acquire both the seismic waves emitted from the surface and the reflections from the locally generated soundwaves.

At block 404, the location of the bottom hole assembly is triangulated from the surface seismic waves detected by the optical fiber. At block 406, the layer structure proximate to the bottom hole assembly is determined from the reflections from the locally generated soundwaves. At block 408, adjustments to the geo steering vectors are determined. The adjustments may be used to change the direct of drilling a wellbore.

Figure 5:
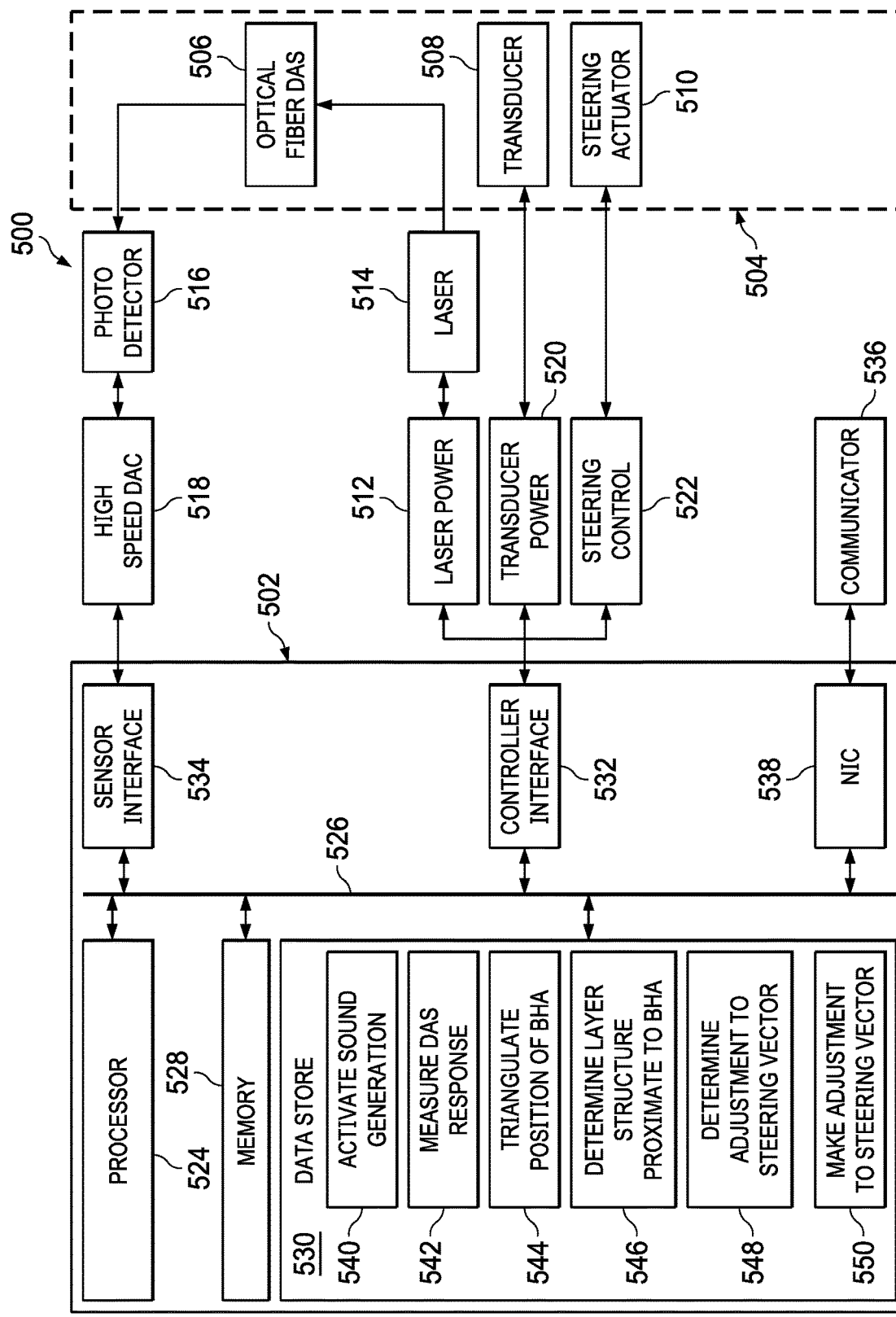
FIG. 5 is a block diagram of a system that may be used for geosteering the BHA based, at least in part, on data from seismic soundwaves from surface sources and reflections from locally generated soundwaves.

FIG. 5 is a block diagram of a system 500 that may be used for geosteering the BHA based, at least in part, on data from seismic soundwaves from surface sources and reflections from locally generated soundwaves. The system 500 includes a controller 502 and BHA sensors/actuators 504. As discussed herein, the BHA sensors/actuators 504 include an optical fiber 506, which may be encased in a protective covering. A transducer element 508 is used to generate local soundwaves proximate to the drill bit of the BHA. In some embodiments, a steering actuator 510, such as a hydraulic head, is used to steer the drill bit in a new direction.

The BHA sensors/actuators 504 are coupled to the controller 502 through a number of different units. For example, a laser power supply 512 is used to power a laser 514, which sends light through the optical fiber 506. The light is detected by a photodetector 516. A high-speed digital-to-analog converter (DAC) 518 is used to convert the light, for example, the signal detected from light pulses, to signals that can be processed by the controller 502. As discussed in further detail with respect to FIG. 6. The light pulses are used to detect soundwaves, such as seismic soundwaves and local emitted soundwaves, impinging on the optical fiber 506. Although the optical fiber 506 is shown as coupled between the laser 514 and the photodetector 516, as discussed with respect to FIG. 6, the optical fiber 506 may be coupled to a single optical system at the surface, such as an optical circulator, wherein the optical fiber 506 is deployed in a single direction down the coiled tubing to the bottom hole assembly 200 (FIG. 2).

The transducer element 508 may be coupled to a transducer power supply 520, for example, by a cable. In some embodiments, as described herein, transducer element 508 does not use a power cable from the surface, but is powered by mud flow through the coiled tubing to the BHA.

If present, the steering actuator 510 may be powered by hydraulic lines, or electric lines, from the surface. For example, a steering control unit 522 may provide the power or hydraulic actuation for the steering actuator 510. In some embodiments, the geo-steering is performed by other techniques, such as the inclusion of bent subs in the BHA.

The controller 502 may be a separate unit mounted in the control shack 116 (FIG. 1), for example, as part of a programmable logic controller (PLC), a distributed control system (DCS), or another computer control unit used for controlling the drilling. In other embodiments, the controller 502 may be a virtual controller running on a processor in a DCS, on a virtual processor in a cloud server, or using other real or virtual processors. In one embodiment, the controller 502 is included in an instrument package attached to the BHA, for example, in the housing with the transducer element 508.

The controller 502 includes a processor 524. The processor 524 may be a microprocessor, a multi-core processor, a multithreaded processor, an ultra-low-voltage processor, an embedded processor, or a virtual processor. In some embodiments, the processor 524 may be part of a system-on-a-chip (SoC) in which the processor 524 and the other components of the controller 502 are formed into a single integrated electronics package. In various embodiments, the processor 524 may include processors from Intel® Corporation of Santa Clara, Calif., from Advanced Micro Devices, Inc. (AMD) of Sunnyvale, Calif., or from ARM Holdings, LTD., Of Cambridge, England. Any number of other processors from other suppliers may also be used.

The processor 524 may communicate with other components of the controller 502 over a bus 526. The bus 526 may include any number of technologies, such as industry standard architecture (ISA), extended ISA (EISA), peripheral component interconnect (PCI), peripheral component interconnect extended (PCIx), PCI express (PCIe), or any number of other technologies. The bus 526 may be a proprietary bus, for example, used in an SoC based system. Other bus technologies may be used, in addition to, or instead of, the technologies above. For example, the interface systems may include I$^2$C buses, serial peripheral interface (SPI) buses, Fieldbus, and the like.

The bus 526 may couple the processor 524 to a memory 528. In some embodiments, such as in PLCs and other process control units, the memory 528 is integrated with a data store 530 used for long-term storage of programs and data. The memory 528 include any number of volatile and nonvolatile memory devices, such as volatile random-access memory (RAM), static random-access memory (SRAM), flash memory, and the like. In smaller devices, such as PLCs, the memory 528 may include registers associated with the processor itself. The data store 530 is used for the persistent storage of information, such as data, applications, operating systems, and so forth. The data store 530 may be a nonvolatile RAM, a solid-state disk drive, or a flash drive, among others. In some embodiments, the data store 530 will include a hard disk drive, such as a micro hard disk drive, a regular hard disk drive, or an array of hard disk drives, for example, associated with a DCS or a cloud server.

The bus 526 couples the processor 524 to a controller interface 532. The controller interface 532 may be an interface to a plant bus, such as a Fieldbus, an I$^2$C bus, an SPI bus, and the like. The controller interface 532 couples the controller 502 to the laser power supply 512, the transducer power supply 520, and, if present, the steering control unit 522. This allows the controller 502 to create light pulses from the laser 514, activate the transducer element 508 to generate sound waves from the BHA 504, and activate the steering actuator 510 to redirect the drill bit for directional drilling.

A sensor interface 534 couples the controller 502 to high-speed DAC 518 for collecting measurements from the photodetector 516. In some embodiments, the sensor interface 534 is an integrated unit that includes the high-speed DAC 518.

If the controller 502 is located in the field, a local human machine interface (HMI) may be used to input control parameters and see results from the distributed acoustic sensor. The local HMI may be coupled to a display, such as a multiline LCD display, or a display screen, among others. A keypad may be coupled to the local HMI for the entry of control parameters, such the frequency of the light pulses, the wavelength of the detected light, and the like.

In some embodiments, the controller 502 is linked to a communicator 536 through a network interface controller (NIC) 538. The communicator 536 may be a router, Ethernet coupling, a wireless network interface, or a plant bus interface, such as Fieldbus.

The data store 530 includes blocks of stored instructions that, when executed, direct the processor 524 to implement the functions of the controller 502. The data store 530 includes a block 540 of instructions to direct the processor to activate sound generation. This may be performed, for example, by powering the transducer element 508 to emit local soundwaves at the BHA 504, instructing an operator of a vibroseis to activate the generation of seismic waves, or both.

The data store 530 includes a block 542 of instructions to direct the processor to measure the response from the optical fiber 506, allowing it to determine soundwave responses detected by the optical fiber. For example, the instructions may direct the processor to activate the laser power supply 512 to cause the laser 514, to emit a string of pulses into the optical fiber 506. Changes in the light passing through the optical fiber 506, or scattered back from the optical fiber 506, may be detected by the photodetector 516, which converts the light into electrical signals. The electrical signals are digitized in the high-speed DAC 518 for processing by the controller 502. This may be performed by a number of different techniques, as described further with respect to FIG. 6.

The data store 530 also includes a block 544 of instructions to direct the processor to triangulate the position of the BHA 504 in the subterranean environment. This may be performed by detecting and identifying seismic soundwaves from multiple vibroseis and comparing the time of arrival of the signals to triangulate the location of the BHA 504.

The data store 530 includes a block 546 of instructions to direct the processor to determine the layer structure proximate to the BHA 504. This may be done by analyzing the reflections of soundwaves emitted by the transducer element 508. The analysis may be performed by seismic analysis techniques based, for example, on the intensity and time of arrival of the reflected soundwaves.

The data store 530 includes a block 548 of instructions to direct the processor to determine adjustments to make to the steering vector for geo-steering the BHA 504. This may be performed, for example, by comparing the location of the BHA 504 determined from the triangulation of the seismic soundwaves from the vibroseis to a seismic map of the reservoir. Further adjustments may be performed by comparing the layer structure to the current location of the BHA 504 to determine the proximity of the upper layer and lower layer bordering the reservoir layer to the BHA 504. Adjustments in the drilling direction may then be made to move the wellbore closer to the desired limits. In automated systems, the data store 530 may include a block 550 of instructions to make adjustments to the steering vector, for example, based on the adjustments determined by the current location of the BHA 504.

Figure 6:
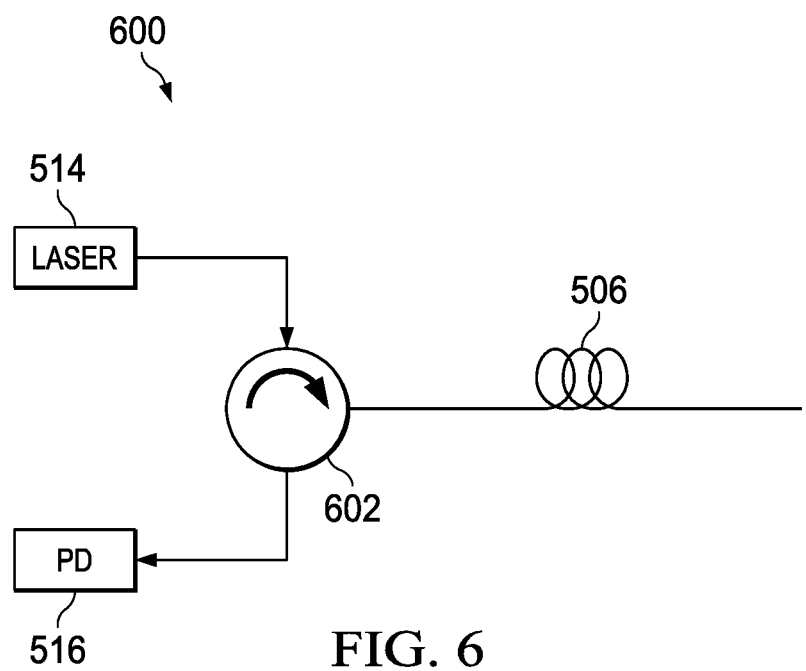
FIG. 6 is a block diagram of an optical fiber-time domain reflectometry (OF-TDR) system that may be used in the BHA to measure soundwaves impinging on an optical fiber.

FIG. 6 is a block diagram of an optical fiber-time domain reflectometry (OF-TDR) system 600 that may be used in the BHA to measure soundwaves impinging on an optical fiber. Like numbered items are as described with respect to FIG. 5. Sensor systems based on OF-TDR may be used to obtain information on the position, frequency, and amplitude of sounds impinging on the optical fiber 506.

In this embodiment, the laser 514 sends a light pulse into an optical circulator 602, which directs the light pulse down the optical fiber 506. Soundwaves impinging on the fiber change the refractive index of the fiber, causing light to be scattered back towards the optical circulator 602. Light received in the optical circulator 602 from the optical fiber 506 is directed to the photodetector 516 for analysis. The photodetector may include other optical systems, such as an interferometer or monochromator to determine the wavelength of the detected light.

The time of flight of the light received from the optical fiber 506 may be used to determine the locations of the sound received, allowing the optical fiber 506 to function as a fiber-optic distributed acoustic sensor (DAS). Depending on the length of the optical fiber 506, this may be analogous to having acoustic detectors every meter along the fiber. Wrapping the fiber around the BHA in a helicoidal arrangement increases the number of detection points along the BHA, and makes determining the originating direction of the sound easier, as the detected sound will repeat at a distance along the fiber determining by the radius of the BHA.

The frequency of the sounds may be determined by the phase shifts of the light pulses received at the photodetector 516. This may be used to identify the source of the sound, such as a vibroseis or the local transducer.

The techniques described herein are not limited to the use of OF-TDR, as other optical measurement techniques may be used. These include the use of Fiber Bragg gratings (FBG) formed in the fibers which allow each FBG to function as a detection point. In the application described herein, the FBGs may be formed in the vicinity of the BHA, increasing the signal power of acoustic signals received at the BHA. Other techniques, such as interferometry techniques, including Sagnac interferometry, may be used. However, these techniques may also increase the complexity of the system as two fibers are often used for detection.

An implementation described herein provides a method for acoustic geosteering in directional drilling. The method includes measuring a response from a fiber-optic distributed acoustic sensor disposed on a bottom hole assembly and determining a location of the bottom hole assembly from seismic waves received from surface sources. A subterranean layer structure proximate to the bottom hole assembly is determined from reflections of a locally generated soundwave. Adjustments to geosteering vectors for the bottom hole assembly based, at least in part, on the location and the subterranean layer structure.

In an aspect, the locally generated soundwave is generated by a transducer proximate to a drill bit on the bottom hole assembly. In an aspect, seismic waves are generated as surface source. In an aspect the seismic waves are generated by a vibroseis.

In an aspect, laser pulses are sent into a fiber-optic and backscattered light from the fiber-optic is measured to measure the response.

In an aspect, the adjustments are used to change the direction of drilling a wellbore.

In an aspect, the subterranean layer structure is determined through a seismic analysis of the reflections from the locally generated soundwave. In an aspect the location of the bottom hole assembly is determined by triangulating soundwaves receive from different surface sources.

In an aspect, a direction of the bottom hole assembly is changed based, at least in part, on the adjustments. In an aspect, the direction of the bottom hole assembly is automatically adjusted.

Another implementation provides a system for acoustic geosteering in directional drilling. The system includes a bottom hole assembly that includes a fiber-optic distributed acoustic sensor comprising an optical fiber helicoidally wrapped around the bottom hole assembly, a drill bit, and a sound transducer located proximate to the drill bit.

In an aspect, the system includes a coiled tubing drilling apparatus. In an aspect, the system includes a fiber-optic cable coupling the optical fiber to optical systems located at the surface. In an aspect, the system includes a pulsed laser to emit light pulses into the optical fiber, and a photodetector detect light from the optical fiber.

In an aspect, the system includes an optical time domain reflectometry system, wherein the photodetector is used to detect backscattered light from the optical fiber. In an aspect, the system includes a Sagnac interferometry system.

In an aspect, the system includes a steering actuator to change a direction of the bottom hole assembly.

In an aspect, the system includes a controller, wherein the controller comprises a processor and a data store. The data store includes instructions that, when executed, direct the processor to measure a response from a distributed acoustic sensor, triangulate a position of the bottom hole assembly from seismic soundwaves received from surface sources, and determine a layer structure proximate to the bottom hole assembly from reflections from locally generated soundwaves emitted by the sound transducer on the bottom hole assembly. The data store further includes instructions that, when executed, direct the processor to determine an adjustment to a steering vector based, at least in part, on the position of the bottom hole assembly and the layer structure proximate to the bottom hole assembly.

In an aspect, the data store includes instructions that, when executed, direct the processor to activate sound generation from the sound transducer. In an aspect, the data store includes instructions that, when executed, direct the processor to instruct operators of the seismic sources to generate the seismic soundwaves.

In an aspect, the data store includes instructions that, when executed, direct the processor to make the adjustment to the steering vector. In an aspect, the data store includes instructions that, when executed, direct the processor to send signals to a steering actuator to change a direction of the bottom hole assembly.

In an aspect, the instructions that direct the processor to measure the response from the distributed acoustic sensor include instructions that, when executed, direct the processor to activate a laser power supply to cause a laser to emit light pulses into the optical fiber, receive data from a high-speed digital-to-analog converter, wherein the high-speed digital-to-analog converter receives signals from a photodetector measuring light from the optical fiber; and determine acoustic signals from the data.

In an aspect, the instructions that direct the processor to triangulate the position comprise instructions that, when executed, direct the processor to: detect seismic soundwaves from multiple vibroseis, and compare a time of arrival of signals from the multiple vibroseis to triangulate a location of the bottom hole assembly.

In an aspect, the instruction to direct the processor to determine the layer structure comprise instructions that, when executed, direct the processor to perform a seismic analysis on the reflections.

Other implementations are also within the scope of the following claims.

What is claimed is:

1. A method for acoustic geosteering in directional drilling, comprising:
   measuring a response from a fiber-optic distributed acoustic sensor disposed on a bottom hole assembly;
   determining a location of the bottom hole assembly from seismic waves received from surface sources;
   determining a subterranean layer structure proximate to the bottom hole assembly from reflections of a locally generated soundwave from a sound transducer disposed on the bottom hole assembly; and
   determining adjustments to geosteering vectors for the bottom hole assembly based, at least in part, on the location and the subterranean layer structure.

2. The method of claim 1, further comprising generating the locally generated soundwave by a transducer proximate to a drill bit on the bottom hole assembly.

3. The method of claim 1, further comprising generating seismic waves at a surface source.

4. The method of claim 3, further comprising generating the seismic waves by a vibroseis.

5. The method of claim 1, further comprising sending laser pulses down a fiber-optic and measuring backscattered light from the fiber-optic to measure the response.

6. The method of claim 1, further comprising using the adjustments to change the direction of drilling a wellbore.

7. The method of claim 1, further comprising determining the subterranean layer structure through a seismic analysis of the reflections from the locally generated soundwave.

8. The method of claim 1, further comprising determining the location of the bottom hole assembly by triangulating seismic waves received from different surface sources.

9. The method of claim 1, further comprising changing a direction of the bottom hole assembly based, at least in part, on the adjustments.

10. The method of claim 9, further comprising automatically adjusting the direction of the bottom hole assembly.

11. A system for acoustic geosteering in directional drilling, comprising a bottom hole assembly comprising:
a fiber-optic distributed acoustic sensor comprising an optical fiber helicoidally wrapped around the bottom hole assembly;
a drill bit;
a sound transducer located proximate to the drill bit; and
a controller, wherein the controller comprises:
a processor; and
a data store, wherein the data store comprises instructions that, when executed, direct the processor to:
measure a response from a distributed acoustic sensor;
triangulate a position of the bottom hole assembly from seismic soundwaves received from surface sources;
determine a layer structure proximate to the bottom hole assembly from reflections from locally generated soundwaves emitted by the sound transducer on the bottom hole assembly; and
determine an adjustment to a steering vector based, at least in part, on the position of the bottom hole assembly and the layer structure proximate to the bottom hole assembly.

12. The system of claim 11, further comprising a coiled tubing drilling apparatus.

13. The system of claim 11, further comprising a fiber-optic cable coupling the optical fiber to optical systems located at the surface.

14. The system of claim 11, further comprising:
a pulsed laser to emit light pulses into the optical fiber; and
a photodetector to detect light from the optical fiber.

15. The system of claim 14, further comprising an optical time domain reflectometry system, wherein the photodetector is used to detect backscattered light from the optical fiber.

16. The system of claim 14, further comprising a Sagnac interferometry system.

17. The system of claim 11, further comprising a steering actuator to change a direction of the bottom hole assembly.

18. The system of claim 11, wherein the data store comprises instructions that, when executed, direct the processor to activate sound generation from the sound transducer.

19. The system of claim 11, wherein the data store comprises instructions that, when executed, direct the processor to instruct operators of the surface sources to generate the seismic soundwaves.

20. The system of claim 11, wherein the data store comprises instructions that, when executed, direct the processor to make the adjustment to the steering vector.

21. The system of claim 20, wherein the data store comprises instructions that, when executed, direct the processor to send signals to a steering actuator to change a direction of the bottom hole assembly.

22. The system of claim 11, wherein the instructions that direct the processor to measure the response from the distributed acoustic sensor comprise instructions that, when executed, direct the processor to:
activate a laser power supply to cause a laser to emit light pulses into the optical fiber;
receive data from a high-speed digital-to-analog converter, wherein the high-speed digital-to-analog converter receives signals from a photodetector measuring light from the optical fiber; and
determine acoustic signals from the data.

23. The system of claim 11, wherein the instructions that direct the processor to triangulate the position comprise instructions that, when executed, direct the processor to:
detect seismic soundwaves from multiple vibroseis; and
compare a time of arrival of signals from the multiple vibroseis to triangulate a location of the bottom hole assembly.

24. The system of claim 11, wherein the instruction to direct the processor to determine the layer structure comprise instructions that, when executed, direct the processor to perform a seismic analysis on the reflections.

* * * * *